R. SIMS.
SHAWL STRAP HANDLE.

No. 175,773. Patented April 4, 1876.

WITNESSES
Henry N. Miller
C. L. Evert

INVENTOR
Richard Sims
By Alexander & Mason
Attorneys

UNITED STATES PATENT OFFICE.

RICHARD SIMS, OF NEWARK, NEW JERSEY.

IMPROVEMENT IN SHAWL-STRAP HANDLES.

Specification forming part of Letters Patent No. 175,773, dated April 4, 1876; application filed November 4, 1875.

*To all whom it may concern:*

Be it known that I, RICHARD SIMS, of Newark, in the county of Essex and in the State of New Jersey, have invented certain new and useful Improvements in Shawl-Strap Handles; and do hereby declare that the following is a full, clear, and exact description thereof, reference being had to the accompanying drawings, and to the letters of reference marked thereon, making a part of this specification.

The nature of my invention consists in the construction and arrangement of a metallic handle for shawl-straps, satchels, traveling-bags, &c., as will be hereinafter more fully set forth.

In order to enable others skilled in the art to which my invention appertains to make and use the same, I will now proceed to describe its construction and operation, referring to the annexed drawing, in which—

Figure 1:
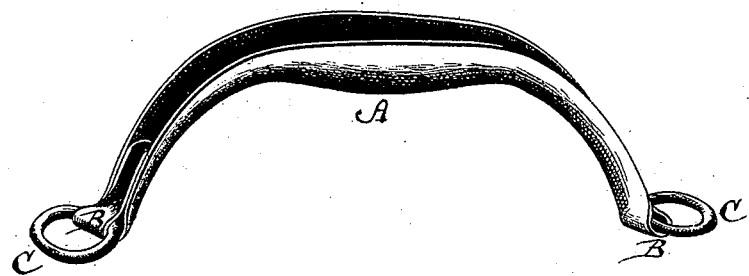
Figure 2:
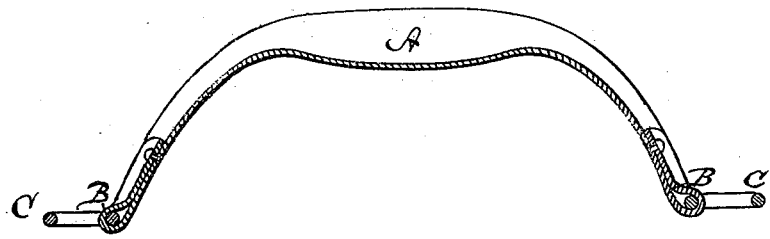

Figure 1 is a perspective view of my improved metallic handle. Fig. 2 is a longitudinal section of the same.

This handle, A, is made of one piece of sheet metal, struck up by suitable dies so as to be concave along its outer side, and the ends turned over to form the loops B B, in which the rings C C are placed. A handle made in this manner is not only light and cheap, but is also strong and durable, and may be used for hand-bags, satchels, shawl and school straps, and many other purposes.

Having thus fully described my invention, what I claim as new, and desire to secure by Letters Patent, is—

A handle for shawl-straps and other purposes, struck up from a single piece of sheet metal in concave form, and having the ends bent over and forming the loops B B to receive the rings C C, substantially as set forth.

In testimony that I claim the foregoing I have hereunto set my hand and seal this 16th day of October, 1875.

RICHARD SIMS. [L. S.]

Witnesses:
CHAS. W. CRANE,
JOHN HOLMES.